United States Patent
Mehta et al.

(10) Patent No.: US 7,020,446 B2
(45) Date of Patent: *Mar. 28, 2006

(54) MULTIPLE ANTENNAS AT TRANSMITTERS AND RECEIVERS TO ACHIEVING HIGHER DIVERSITY AND DATA RATES IN MIMO SYSTEMS

(75) Inventors: Neelesh B. Mehta, Medford, MA (US); Pallav Sudarshan, Raleigh, NC (US); Andreas F. Molisch, Arlington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 94 days.

This patent is subject to a terminal disclaimer.

(21) Appl. No.: 10/828,625

(22) Filed: Apr. 21, 2004

(65) Prior Publication Data

US 2004/0202257 A1    Oct. 14, 2004

Related U.S. Application Data

(63) Continuation-in-part of application No. 10/209,306, filed on Jul. 31, 2002.

(51) Int. Cl.
*H04B 7/02* (2006.01)
(52) U.S. Cl. .................. 455/101; 45/562.1; 45/560
(58) Field of Classification Search ............... 455/101, 455/552.1, 553.1, 562.1, 560, 561, 277.1, 455/276.1; 375/146, 267, 299, 350
See application file for complete search history.

(56) References Cited

U.S. PATENT DOCUMENTS 6,934,320 B1 *  8/2005  Tujkovic et al. ............ 375/146
2003/0235147 A1 * 12/2003  Walton et al. .............. 370/204

FOREIGN PATENT DOCUMENTS

| EP | 1207645 | * | 5/2002 |
| EP | 1207645 A | | 5/2002 |
| WO | WO2004/014013 A1 | | 2/2004 |

OTHER PUBLICATIONS

U.S. Appl. No. 10/209,306, filed Jul. 31, 2002, Horng et al.
Foschini et al., "On Limits of Wireless Communications in a Fading Environment when Using Multiple Antennas," Wireless Pers. Commun., pp, 311-335, 1998.
Wolniansky et al., "V-BLAST: An Architecture for Realizing Very High Data Rates Over the Rich-Scattering Wireless Channel," ISSSE, pp. 295-299, 1998.

(Continued)

*Primary Examiner*—Tilahun Gesesse
(74) *Attorney, Agent, or Firm*—Dick Brinkman; Andrew J. Curtin

(57) ABSTRACT

A method transmits an input stream of data symbols in a multiple-input, multiple-output wireless communications system. The input stream is demultiplexed into M substreams. Each of the M substreams is adaptively modulated and coded to a coded substream according to channel conditions. A first of the M coded substreams is space-time transmit diversity encoding into two space-time transmit diversity encoded substreams. There is one space-time transmit diversity encoded substream for each one of two transmit antennas. Each other coded substream is transmitted directly by a corresponding one of remaining M−1 transmit antenna.

7 Claims, 2 Drawing Sheets

OTHER PUBLICATIONS

Sellathurai egt al., "*TURBO-BLAST for Wireless Communications: Theory and Experiments*," IEEE Trans. Commun., vol. 50, No. 10, pp. 2538-2546, Oct. 2002.

Tarokh et al., "*Space Time Codes for High Data Rate Wireless Communication*," IEEE Trans. Inform. Theory, vol. 44, pp. 744-765, 1999.

Alamouti, "*A simple transmit diversity technique for wireless communications*," IEEE J. Selected Areas in Commun., vol. 16, Oct., pp. 1451-1458, 1998.

Zheng and Tse, "*Diversity and Multiplexing: A Fundamental Tradeoff in Multiple-Antenna Channels*," IEEE Transactions on Information Theory, vol. 49, No. 5, pp. 1073-1096, May 2003.

* cited by examiner

MULTIPLE ANTENNAS AT TRANSMITTERS AND RECEIVERS TO ACHIEVING HIGHER DIVERSITY AND DATA RATES IN MIMO SYSTEMS

RELATED APPLICATION

This application is a Continuation-in-Part of U.S. patent application Ser. No. 10/209,306, "MIMO Systems with Rate Feedback and Space Time Transmit Diversity," filed by Horng, et al. on Jul. 31, 2002. This application is related to a U.S. patent application titled "Space Time Transmit Diversity with SubGroup Rate Control and SubGroup Antenna Selection in Multi-Input Multi-Output Communications Systems," by Mehta et al., co-filed herewith, and incorporated herein by reference.

FIELD OF THE INVENTION

The invention relates generally to wireless communication systems, and more particularly to selecting antennas in multiple input, multiple output wireless communications systems.

BACKGROUND OF THE INVENTION

Multiple-input, multiple-out (MIMO) antenna systems are envisaged for deployment in wireless communications systems designed according to future 3G and 4G standards. The multiple antennas will support high data rates and increase capacity and coverage for a cellular telephone systems that provide both high rate and low rate services to multiple users in a fixed bandwidth wireless channel. Multiple antenna systems exploit spatial characteristics of the channel using spatial multiplexing and transmit diversity.

In spatial multiplexing, multiple data streams are transmitted concurrently from multiple antennas and received by multiple antennas, Foschini et al., "*On Limits of Wireless Communications in a Fading Environment when Using Multiple Antennas,*" Wireless Pers. Commun., pp, 311–335, 1998. A number of architectures are known that attempt to achieve a theoretical capacity of the channel, Foschini et al., "*Layered Space-Time Architecture for Wireless Communication in a Fading Environment When Using Multiple Antennas,*" Bell Labs Tech. J., vol. 1, no. 2, pp. 41–59, 1996, Wolniansky et al., "*V-BLAST: An Architecture for Realizing Very High Data Rates Over the Rich-Scattering Wireless Channel,*" ISSSE, pp. 295–299, 1998 and Sellathurai eg. al., "*TURBO-BLAST for Wireless Communications: Theory and Experiments,*" IEEE Trans. Commun., vol. 50, no. 10, pp. 2538–2546, October 2002.

In transmit diversity, the same data stream is transmitted over multiple transmit antennas to increase a diversity order of the signal at the receiver, Anderson, "*Antenna Arrays in Mobile Communications: Gain, diversity and channel capacity,*" IEEE Antennas Propagat. Mag., vol. 42, pp. 12–16, April 2000.

Closed-loop (CL) diversity systems exploit information about the channel at the transmitter, Sandell, "*Analytical analysis of transmit diversity in WCDMA on fading multipath channels,*" IEEE Int. Symp. on Personal, Indoor and Mobile Radio Commun., 1999. Open-loop (OL) system do not exploit channel information, Tarokh et al., "*Space Time Codes for High Data Rate Wireless Communication,*" IEEE Trans. Inform. Theory, vol. 44, pp. 744–765, 1999, and Alamouti, "*A simple transmit diversity technique for wireless communications,*" IEEE J. Selected Areas in Commun., vol. 16, October, pp. 1451–1458, 1998.

With space time transmit diversity (STTD), a transmit diversity technique requires two transmit antennas and at least one receive antenna, 3GPP Standard TR 25.211, "*Physical Channels and Mapping of Transport Channels onto Physical Channels (FDD),*" v5.4.0, June 2003. Multiple antenna solutions for higher number of transmit and receive antennas have also been described for 3GPP, "*TR25.869: Transmitter diversity solutions for multiple antennas,*" v1.2.0, September 2003, and "*TR 25.876: Multiple Input Multiple Output (MIMO) Antennae in UTRA,*" v1.3.0, February 2004.

While spatial multiplexing provides higher data rates and increases the spectral efficiency of wireless links, transmit and receive diversity make single stream transmission more reliable in time-varying wireless channels. Thereby, the range and area of acceptable coverage is increased. There exists a fundamental trade-off between achievable diversity and spatial multiplexing gains, Zheng and Tse, "*Diversity and Multiplexing: A Fundamental Tradeoff in Multiple-Antenna Channels,*" IEEE Transactions on Information Theory, Vol. 49, No. 5, pp. 1073–1096, May 2003.

Another issues is the number of antenna elements that user equipment (UE), e.g., a small, hand-held, cellular telephone can accommodate. Schemes based on STTD, for example, double space time transmit diversity with subgroup rate control, (DSTTD-SGRC), as described in U.S. patent application Ser. No. 10/209,306, "*MIMO Systems with Rate Feedback and Space Time Transmit Diversity,*" filed by Horng et al., on Jul. $31^{st}$, 2002, require that the number of receive antennas is only half the number of transmit antennas for proper decoding of the transmitted signal.

Pure transmit diversity techniques, such as maximum ratio transmission (MRT), do not place any minimum requirements on the number of receive antennas. V-BLAST and other similar techniques require at least as many receive antennas as transmit antennas. For example, for four transmit antennas, DSTTD-SGRC requires two antennas while V-BLAST requires four receive antennas, while MRT requires one receive antenna.

SUMMARY OF THE INVENTION

A method transmits an input stream of data symbols in a multiple-input, multiple-output wireless communications system. The input stream is demultiplexed into M substreams.

Each of the M substreams is adaptively modulated and coded to a coded substream according to channel conditions. A first of the M coded substreams is space-time transmit diversity encoded into two space-time transmit diversity encoded substreams. There is one space-time transmit diversity encoded substream for each one of two transmit antennas.

Each other coded substream is transmitted directly by a corresponding one of remaining M−1 transmit antennas.

DETAILED DESCRIPTION OF THE PREFERRED EMBODIMENT

The invention provides a transmitter that is backward compatible with transmitters that use space-time transmit diversity (STTD) coding to increase a diversity order of a spatial channel. The transmitter transmits multiple independent data streams concurrently, and requires fewer receive antennas than transmit antennas. Adaptive modulation and coding (AMC) is applied to each of the independent data streams to match different channel conditions with required performance, and to achieve a higher system capacity.

Figure 1:
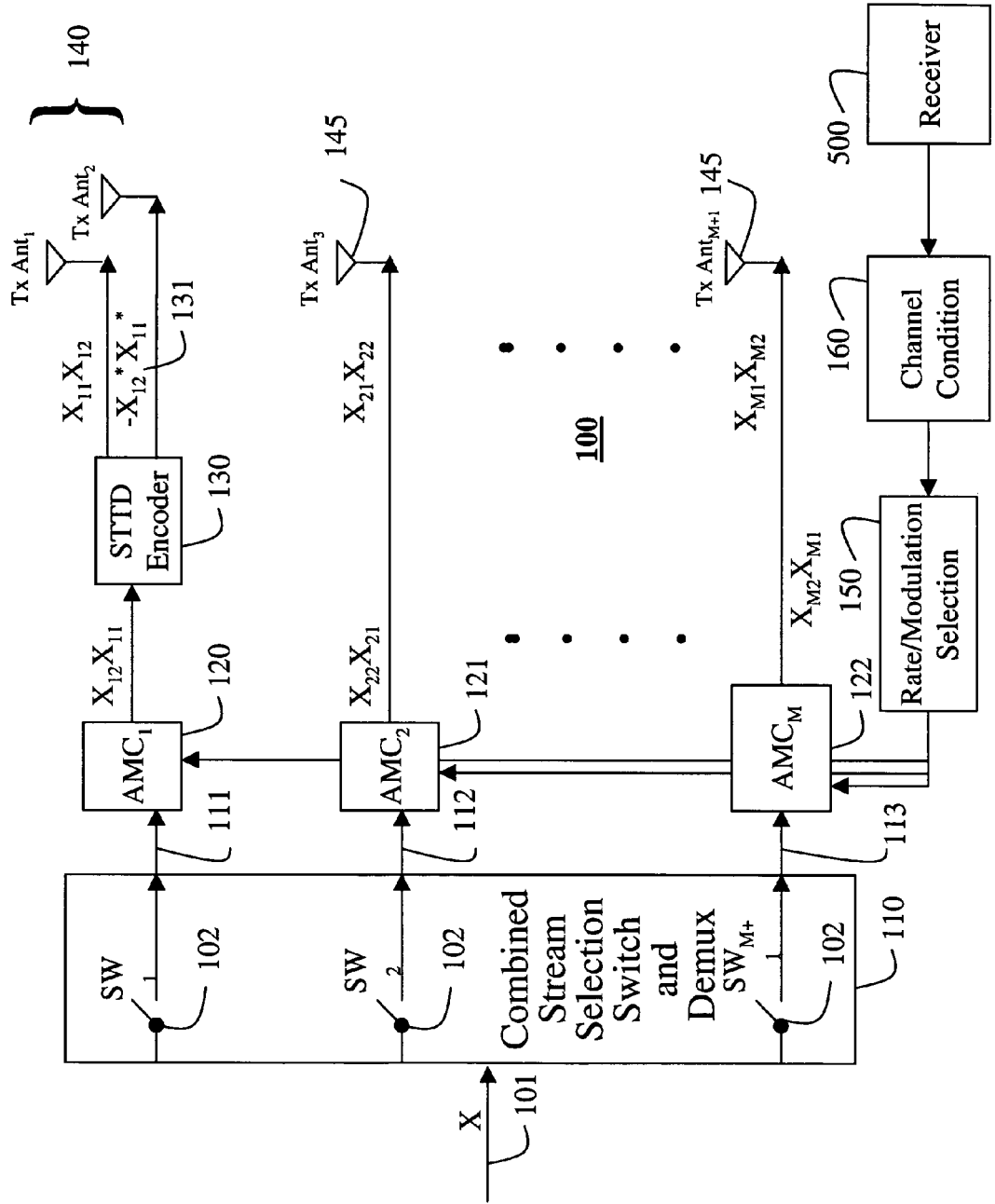
FIG. 1 is a block diagram of a transmitter according to the invention.

FIG. 1 shows a transmitter 100 for a multiple-input, multiple-out (MIMO) wireless communications systems according to the invention. The transmitter 100 includes M+1 transmit antennas. A first pair of antennas is labeled 140, and the remaining M−1 single antennas are labeled 145.

A data stream X 101 is provided to a combined stream selection switch and demultiplexer (demux) 110. The demultiplexer 110 partitions the stream 101 into, at most, M substreams 111–113. A first substream is fed to the first pair of antennas 140, and each of the remaining M−1 substreams are fed directly to the corresponding one of the remaining M−1 single antennas 145.

Depending on a channel condition 160 feedback from a receiver 500, or other constraints such as backward compatibility, some of the M+1 antennas can be turned off or deselected by switches (SW) 102. These are called 'inactive' antennas. The remaining 'active' antennas transmit the substreams with particular coding rates and modulation based on the channel condition 160 as determined by a rate and modulation selection block 150. For further details see the related application. Of course deselecting some of the antennas means that the demultiplexer produces a fewer number of substreams.

The first substream 111 is to be transmitted by the two transmit antennas 140, via a STTD encoder 130. Each of the remaining substreams 112–113 is to be transmitted by a corresponding one of the single antennas 145.

During the duration of two symbols, the STUD encoder 130 takes in information symbols $X_{11}$ and $X_{12}$ of the first stream 111, and outputs two pairs of symbols 131 as:

$$\begin{pmatrix} x_{11} & x_{12} \\ -x_{21}^* & x_{22}^* \end{pmatrix},$$

where * denotes a complex conjugate, and each row (pair) represents the output to a specific one of the two transmit antennas 140.

The other active substreams take the two information symbols $X_{i1}$ and $X_{i2}$ and transmit the symbols directly as $(X_{i1}\ X_{i2})$, where i is the substream number.

Spreading and Scrambling

In WCDMA systems, the output of the STTD block 130 is further demultiplexed into N streams, where N is the number of orthogonal variable spreading factor (OVSF) codes assigned. Each stream is spread with its respective OVSF code (OC) and then scrambled with a corresponding scrambling code (SC). The scrambled streams are then combined and transmitted from one or two antennas, depending on whether the stream uses STTD or not. For further details see the related application.

Receiver Structure

The number of transmit antennas is (M+1). To uniquely decode the input data stream 101, the receiver has at least M antennas. This is summarized in Table A.

TABLE A

| Number of active transmit antennas | Required number of receive antennas |
|---|---|
| 2 | 1 |
| 3 | 2 |
| 4 | 3 |
| M + 1 | M |

The transmitter according to the invention provides a middle ground between D-STTD and V-BLAST-based transmitter structures.

Figure 2:
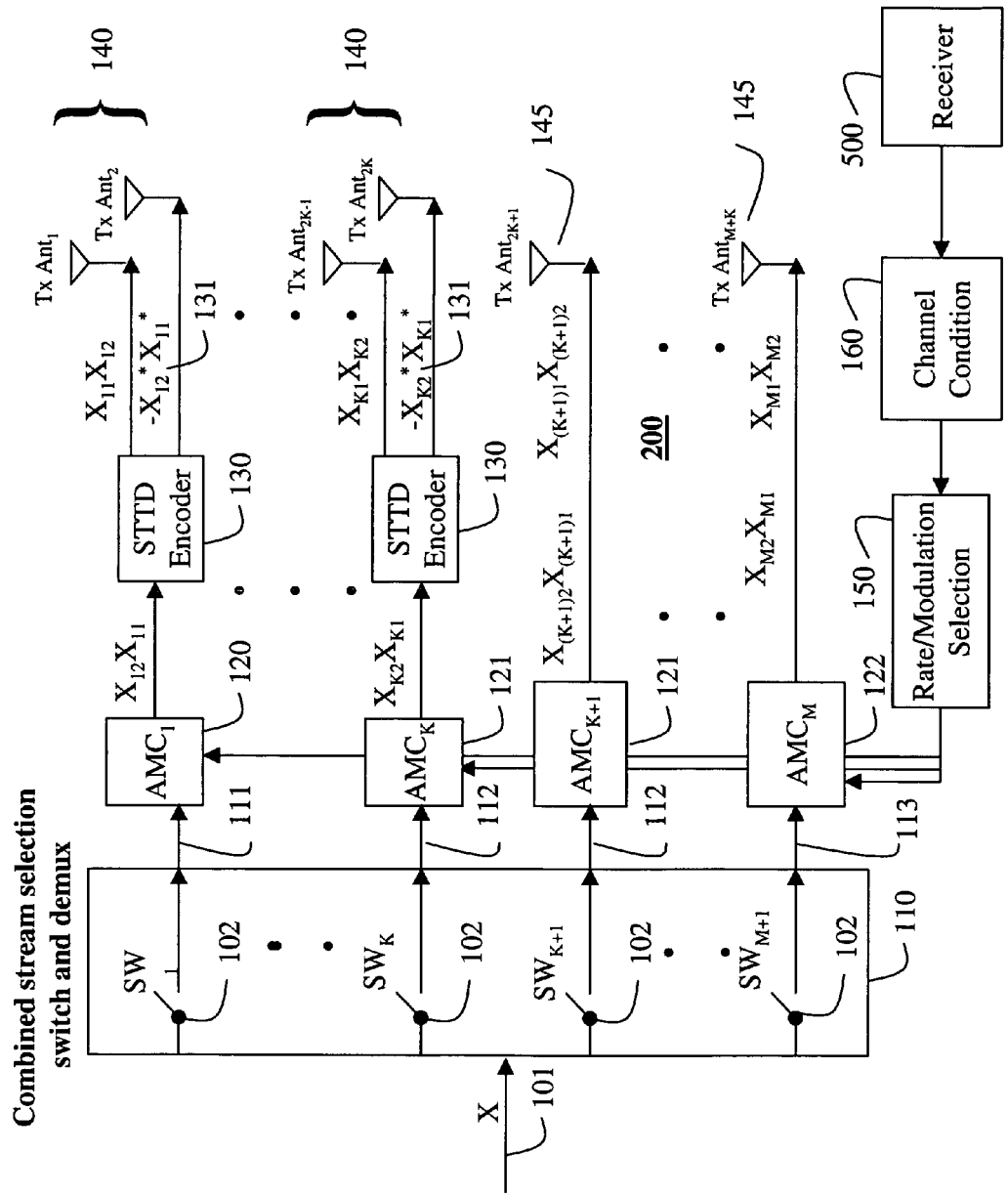
FIG. 2 is a block diagram of a transmitter according to an alternative embodiment of the invention.

FIG. 2 shows an alternative embodiment. In this transmitter, the first two substreams are fed to corresponding pairs of transmit antennas. In this case for M substreams, the transmitter 200 includes M+2 transmit antennas. The first two pairs of antennas are labeled 140, and the remaining M−2 single antennas are labeled 145.

It is to be understood that various other adaptations and modifications may be made within the spirit and scope of the invention. Therefore, it is the object of the appended claims to cover all such variations and modifications as come within the true spirit and scope of the invention.

We claim:

1. A method for transmitting an input stream of data symbols in a multiple-input/multiple-output wireless communications system, comprising:
   demultiplexing the input stream into M substreams;
   adaptively modulating and coding each of the M substreams to a coded substream;
   space-time transmit diversity encoding a first of the M coded substreams into two space-time transmit diversity encoded output substreams, one space-time transmit diversity encoded output substream to be transmitted by a corresponding one of two transmit antenna;
   demultiplexing each output substream into a plurality demultiplexed output streams;
   multiplying each of the plurality of demultiplexed output streams by an orthogonal variable spreading factor;
   adding the demultiplexed output bitstreams, for each output stream, after multiplication into a summed output stream corresponding to each output stream;
   multiplying each summed output stream by a scrambling code; and
   transmitting directly each other coded substream by a corresponding single transmit antenna.

2. The method of claim 1 further comprising:
   feeding back, from a receiver, channel conditions of an associated channel for each transmit antenna.
   selecting a maximum data rate and a modulation for each substream based on the channel conditions.

3. The method of claim 2, in which the channel conditions measure a signal to interference plus noise ratio of the output streams received in the receiver.

4. The method of claim 2, further comprising:
   selecting the number M of substreams based on the channel condition.

5. The method of claim 1, in which the adaptive modulating and coding, further comprises:
   coding each substream;
   interleaving each coded substream; and
   symbol mapping each interleaved substream.

6. The method of claim 1, further comprising:
space-time transmit diversity encoding each of a subset of the M coded substreams into two space-time transmit diversity encoded substreams, one space-time transmit diversity encoded substream to be transmitted by a corresponding one of two transmit antenna; and
transmitting directly each other of the M coded substream not included in the subset by a corresponding single transmit antenna.

7. An apparatus for transmitting an input stream of data symbols in a multiple-input/multiple-output wireless communications system, comprising:
M+1 transmit antennas;
a demultiplexer configured to demultiplex the input stream into M substreams;
M means for adaptively modulating and coding each of the M substreams to a coded substream;
means for space-time transmit diversity encoding a first of the M coded substreams into two space-time transmit diversity encoded substreams, one space-time transmit diversity encoded substream to be transmitted by a corresponding one of two transmit antenna;
means for demultiplexing each output stream into a plurality demultiplexed output streams;
means for multiplying each of the plurality of demultiplexed output streams by an orthogonal variable spreading factor;
means for adding the demultiplexed output streams, for each output stream, after multiplication into a summed output stream corresponding to each output stream;
means for multiplying each summed output stream by a scrambling code; and
means for transmitting directly each other M−1 coded substream by a corresponding single transmit antenna.

* * * * *